(12) United States Patent
Meyers et al.

(10) Patent No.: US 12,286,272 B2
(45) Date of Patent: Apr. 29, 2025

(54) BEVERAGE CONTAINER LID WITH LATCHING HANDLE

(71) Applicant: Runway Blue, LLC, Lehi, UT (US)

(72) Inventors: David O. Meyers, Layton, UT (US); John R. Omdahl, II, Lindon, UT (US); David Bytheway, Springville, UT (US)

(73) Assignee: Runway Blue, LLC, Lehi, UT (US)

( * ) Notice: Subject to any disclaimer, the term of this patent is extended or adjusted under 35 U.S.C. 154(b) by 114 days.

(21) Appl. No.: 18/194,075

(22) Filed: Mar. 31, 2023

(65) Prior Publication Data

US 2023/0312179 A1 Oct. 5, 2023

Related U.S. Application Data

(60) Provisional application No. 63/325,841, filed on Mar. 31, 2022.

(51) Int. Cl.
*B65D 25/22* (2006.01)
*B65D 25/28* (2006.01)
*B65D 51/24* (2006.01)

(52) U.S. Cl.
CPC ......... *B65D 25/22* (2013.01); *B65D 25/2835* (2013.01); *B65D 51/242* (2013.01); *B65D 2251/06* (2013.01); *B65D 2525/288* (2013.01)

(58) Field of Classification Search
CPC .. B65D 25/22; B65D 25/2835; B65D 51/242; B65D 2251/06; B65D 2525/288; B65D 2251/1058; B65D 47/065; B65D 47/0871; B65D 47/141; B65D 47/249; A47G 19/2266; A47G 19/2272; A47J 41/0027
See application file for complete search history.

(56) References Cited

U.S. PATENT DOCUMENTS

| | | | | |
|---|---|---|---|---|
| 7,762,437 B2 * | 7/2010 | Holcomb | ............. | B65D 51/242 220/714 |
| 8,689,989 B2 * | 4/2014 | Lane | ......................... | A45F 3/16 220/264 |
| 8,844,746 B2 * | 9/2014 | Meyers | ............. | B65D 47/0871 220/264 |
| 9,272,822 B2 * | 3/2016 | Samartgis | ............ | B65D 47/148 |
| 9,913,552 B2 * | 3/2018 | Elsaden | ............... | B65D 47/249 |
| 11,390,432 B2 * | 7/2022 | Li | ......................... | F16C 11/045 |

(Continued)

FOREIGN PATENT DOCUMENTS

SE 1851068 A1 3/2020

*Primary Examiner* — James N Smalley
(74) *Attorney, Agent, or Firm* — Sterne, Kessler, Goldstein & Fox P.L.L.C.

(57) ABSTRACT

Some embodiments described herein are directed to a lid for a beverage container including a lid base, a closure, and a handle. The lid base may define a drinking opening therethrough. The closure may be coupled to the lid base and movable between a closed position in which the closure covers the drinking opening and an open position in which the closure does not cover the drinking opening. The handle may be coupled to the lid base and rotatable about a handle rotation axis. When the closure is in the closed position, the closure remains in the closed position when the handle is rotated within a first handle range. In response to the handle being rotated beyond the first handle range when the closure is in the closed position, the closure automatically moves from the closed position to the open position.

27 Claims, 13 Drawing Sheets

(56) References Cited

U.S. PATENT DOCUMENTS

| | | | |
|---|---|---|---|
| 11,834,233 B2* | 12/2023 | Luhrs | B65D 51/1683 |
| 2012/0031902 A1 | 2/2012 | Gilbert | |
| 2021/0130051 A1* | 5/2021 | Meyers | B65D 43/0229 |
| 2021/0347535 A1 | 11/2021 | Ni | |
| 2023/0249878 A1* | 8/2023 | Holowaychuk | B01F 31/441 |
| | | | 206/219 |

* cited by examiner

BEVERAGE CONTAINER LID WITH LATCHING HANDLE

CROSS-REFERENCE TO RELATED APPLICATION

This application claims the benefit of U.S. Provisional Patent Application No. 63/325,841, filed Mar. 31, 2022, which is incorporated herein in its entirety by reference thereto.

FIELD

This disclosure generally relates to lids for beverage containers. More specifically, some embodiments relate to beverage containers with mechanisms for opening a closure.

BACKGROUND

A beverage container may include a closure to close a drinking opening of the beverage container and a mechanism to open the closure. A beverage container may also include a handle to carry the beverage container.

SUMMARY

Some embodiments described herein are directed to a lid for a beverage container including a lid base, a closure, a latching member, and a handle. The lid base may define a drinking opening therethrough. The closure may be coupled to the lid base and may be movable between a closed position in which the closure covers the drinking opening and an open position in which the closure does not cover the drinking opening. The latching member may be coupled to the lid base and configured to selectively retain the closure in the closed position. The handle may be coupled to the lid base and movable between a first handle position and a second handle position. In response to the handle moving from the first handle position to the second handle position, the latching member moves from a latching position to an unlatched position. In the latching position, the latching member retains the closure in the closed position when the closure is in the closed position. In the unlatched position, the latching member does not retain the closure. The closure is biased toward the open position such that the closure automatically moves from the closed position to the open position when the latching member moves to the unlatched position.

Some embodiments described herein are directed to a lid for a beverage container including a lid base, a closure, and a handle. The lid base may define a drinking opening therethrough. The closure may be coupled to the lid base and movable between a closed position in which the closure covers the drinking opening and an open position in which the closure does not cover the drinking opening. The handle may be coupled to the lid base and rotatable about a handle rotation axis. When the closure is in the closed position, the closure remains in the closed position when the handle is rotated within a first handle range. In response to the handle being rotated beyond the first handle range when the closure is in the closed position, the closure automatically moves from the closed position to the open position.

Some embodiments described herein are directed to a method for unsealing a drinking opening of a beverage container including rotating a handle of a beverage container lid in a first rotational direction about a handle axis, and releasing the handle. Rotating the handle in the first rotational direction causes a closure of the lid to open and thereby unseal the drinking opening. Releasing the handle causes the handle to rotate about the handle axis in a second rotational direction opposite the first rotational direction while the closure remains in an open position.

BRIEF DESCRIPTION OF THE FIGURES

The accompanying drawings, which are incorporated herein and form a part of the specification, illustrate the present disclosure and, together with the description, further serve to explain the principles thereof and to enable a person skilled in the pertinent art to make and use the same.

DETAILED DESCRIPTION

Figure 1:
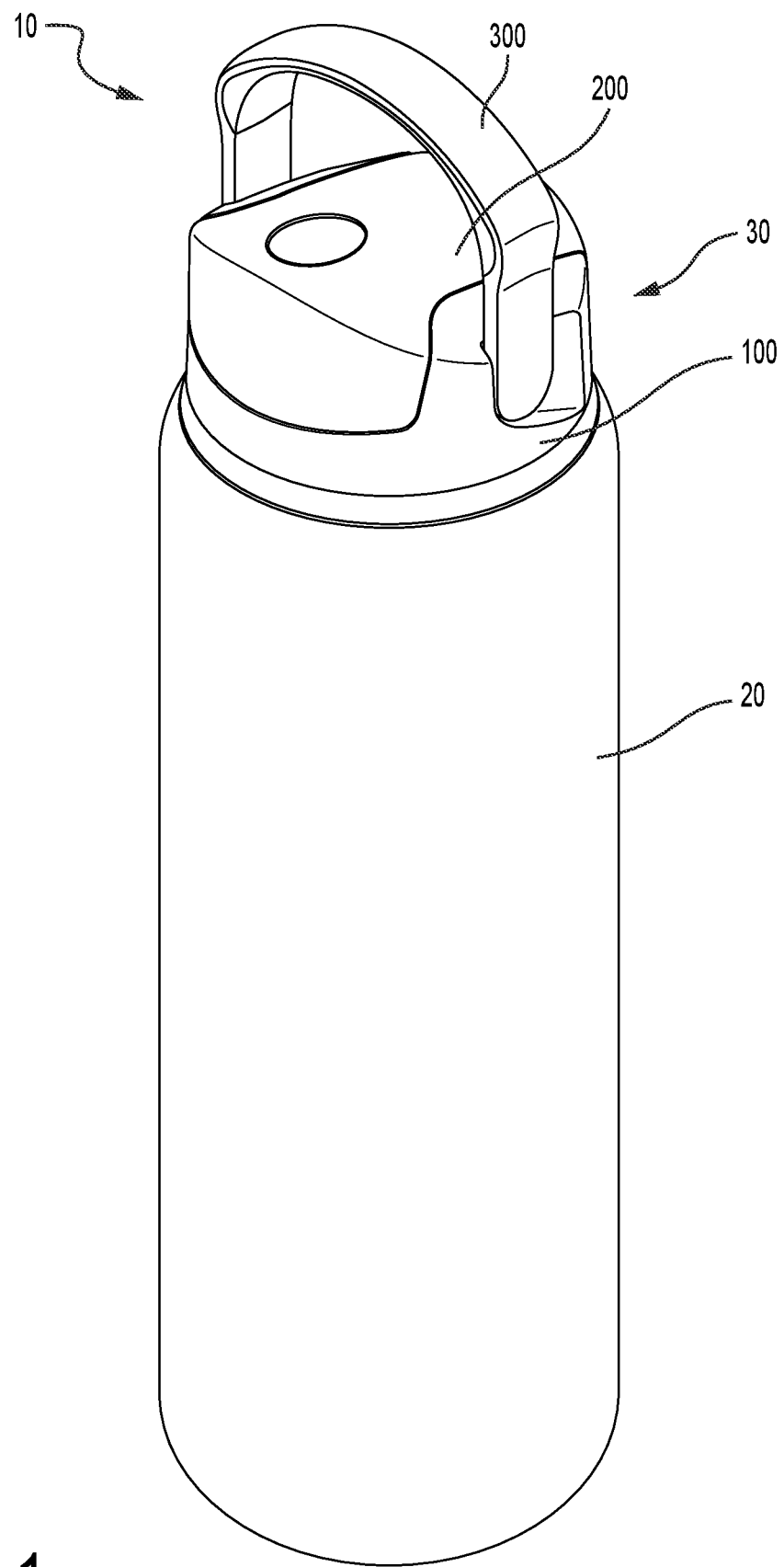
FIG. 1 shows an upper front view of a beverage container, with a closure of the beverage container in a closed position and with a handle of the beverage container in an upright position.
Figure 2:
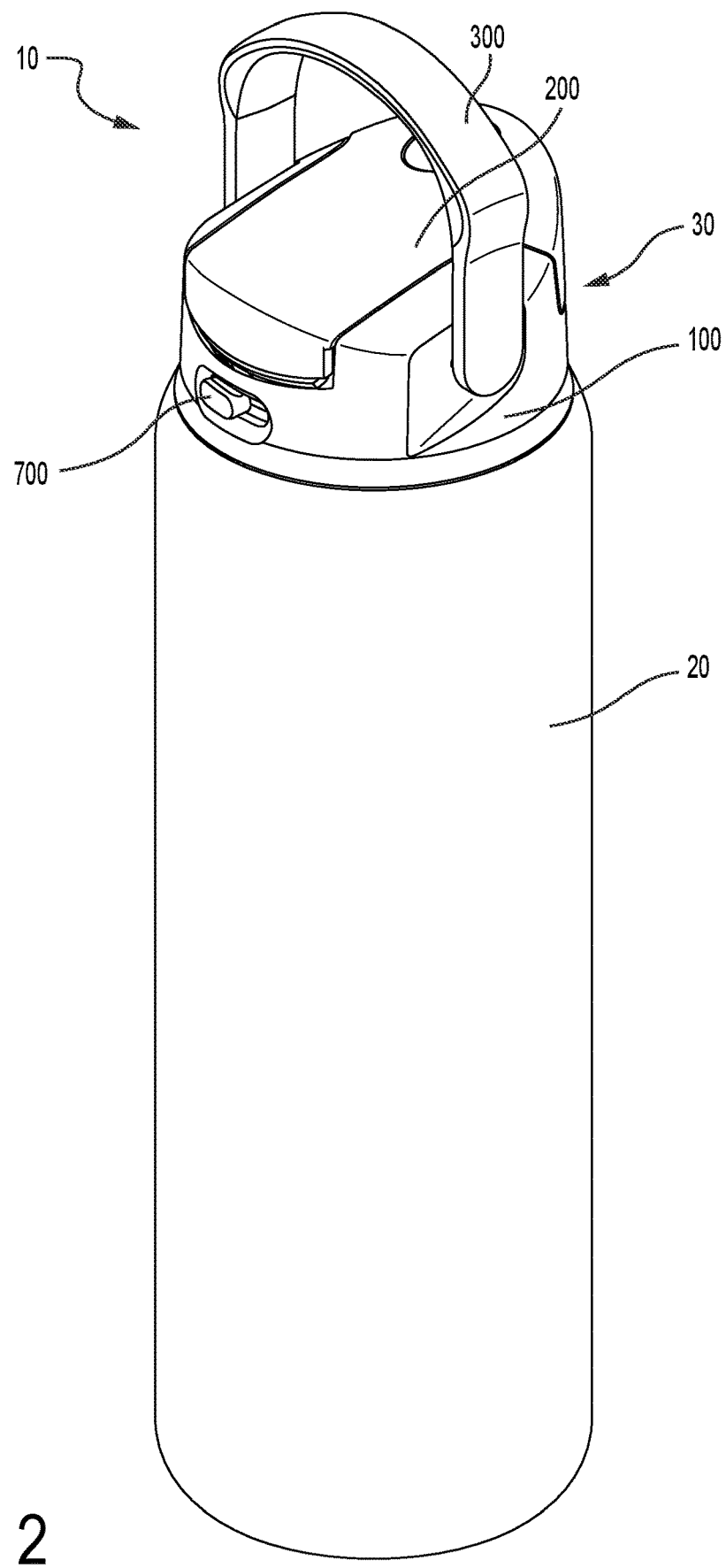
FIG. 2 shows an upper rear view of the beverage container of FIG. 1.
Figure 3:
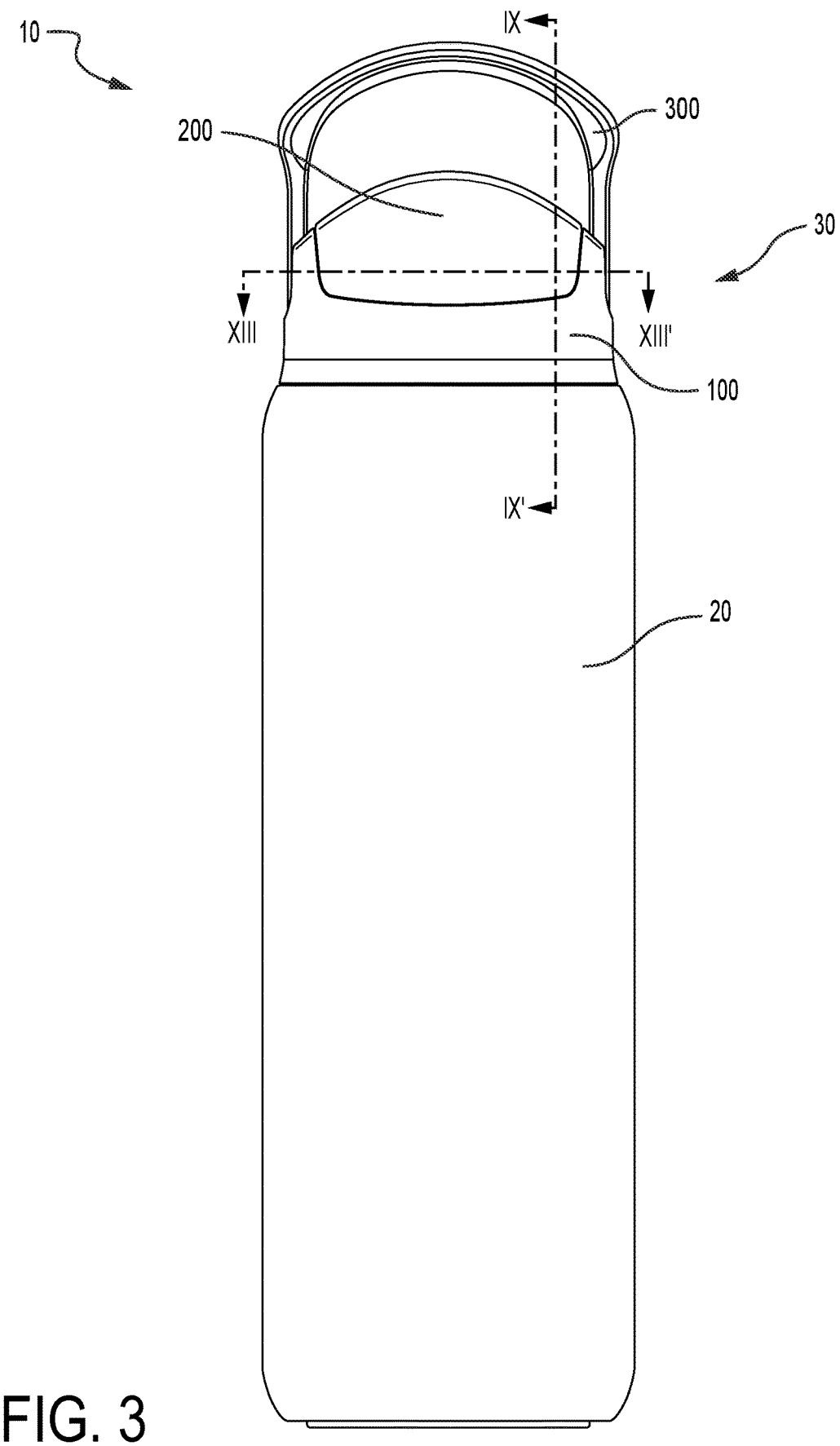
FIG. 3 shows a front view of the beverage container of FIG. 1.

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein comport with standards used by those experienced or skilled in the art to most effectively convey the substance of their work to others skilled in the art. In some instances, well-known methods, procedures, components, and elements have not been described in detail to avoid unnecessarily obscuring aspects of the disclosure.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, this disclosure has been prepared such that when a particular feature, structure, or characteristic is described in connection with an embodiment, it is within the knowledge of one skilled in the art to apply such feature, structure, or characteristic in connection with other embodiments whether or not explicitly described.

The following examples are illustrative, but not limiting, of the present disclosure. Other suitable modifications and adaptations of the variety of conditions and parameters normally encountered in the field, and which would be apparent to those skilled in the art, are within the spirit and scope of the disclosure.

People use reusable beverage containers to carry a variety of beverages. It is often desirable for a beverage container to have a closure to open and close a drinking opening of the beverage container. Closing the drinking opening when a user is not drinking from it can, for example, allow a user to carry the beverage container without worrying that the beverage being carried will leak on the user or the user's belongings. Users may appreciate a beverage container that can be easily opened and closed so that the user can easily drink from the beverage container.

Users may also appreciate a beverage container that has a sleek appearance with relatively few components visible from the outside of the beverage container.

Some embodiments of the present disclosure provide a lid for a beverage container that can be used to easily open and close a drinking opening of the lid. The lid includes a closure to selectively close a drinking opening of the lid. The lid also includes a handle that can be used to carry the beverage container and to open the closure to access the drinking opening. When the closure is closed and the handle is moved within a first handle range (e.g., pivoted between a vertical position and a rearward horizontal position), the closure remains closed. Accordingly, a user can reliably use the handle to carry the beverage container when the handle is positioned within the first handle range. When the handle is moved beyond the first handle range (e.g., pivoted to a rearward declined position) when the closure is in the closed position, the closure automatically opens. In this way, a user can use the handle to open the closure of the beverage container to access the drinking opening and drink from the beverage container.

In some embodiments, the lid includes a lock so that the closure is not accidently opened.

These and other embodiments are discussed below in more detail with reference to the figures.

FIGS. 1-6 show a beverage container 10 according to some embodiments. Beverage container 10 may include a vessel 20 and a lid 30 for vessel 20. Lid 30 may include multiple components, including a lid base 100, a closure 200, and a handle 300.

Figure 5:
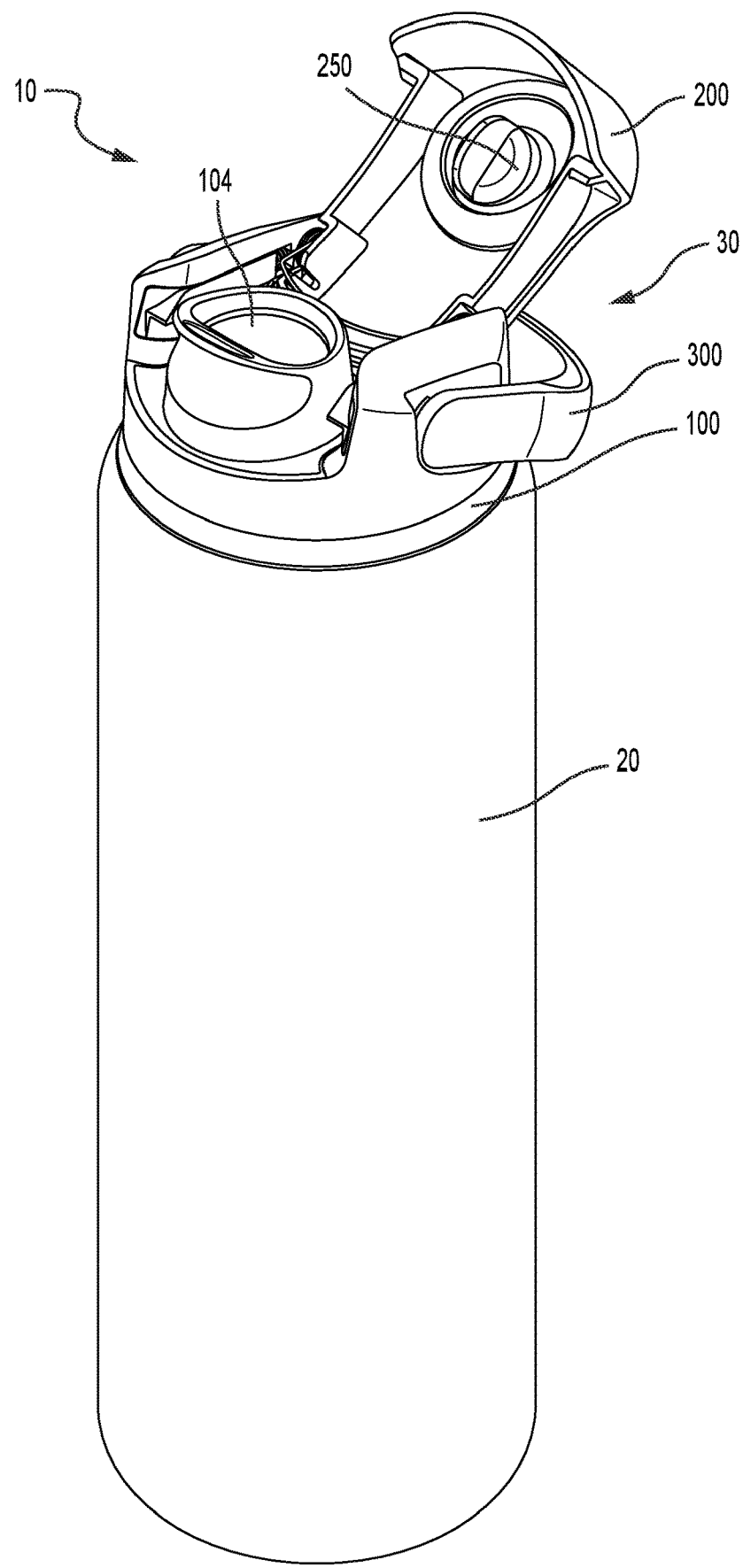
FIG. 5 shows an upper front view of the beverage container of FIG. 1 with the handle in a rearward declined position and with the closure in an open position.

As shown, for example, in FIG. 5, lid base 100 may include a drinking opening 104 (e.g., in a spout) through which a user can drink a beverage contained within beverage container 10 when lid 30 is assembled with vessel 20.

Closure 200 may be moveable relative to lid base 100 between a closed position (shown in FIGS. 1-4) in which closure 200 covers drinking opening 104 and an open position (shown in FIGS. 5 and 6) in which closure 200 does not cover drinking opening 104. For example, as shown in FIGS. 1-6, closure 200 may pivot about closure axis 50 (shown, for example, in FIGS. 9-12) in a first rotational direction to pivot between the closed position shown in FIG. 4 and the open position shown in FIG. 5.

When closure 200 is in the closed position, a sealing member 250 of closure 200 may seal drinking opening 104. When closure 200 is in the open position, a user may access drinking opening 104 to drink from beverage container 10 through drinking opening 104.

Handle 300 may also be movable relative to lid base 100. For example, a user may pivot handle 300 about handle axis 60 to move handle 300 between a variety of positions.

Figure 4:
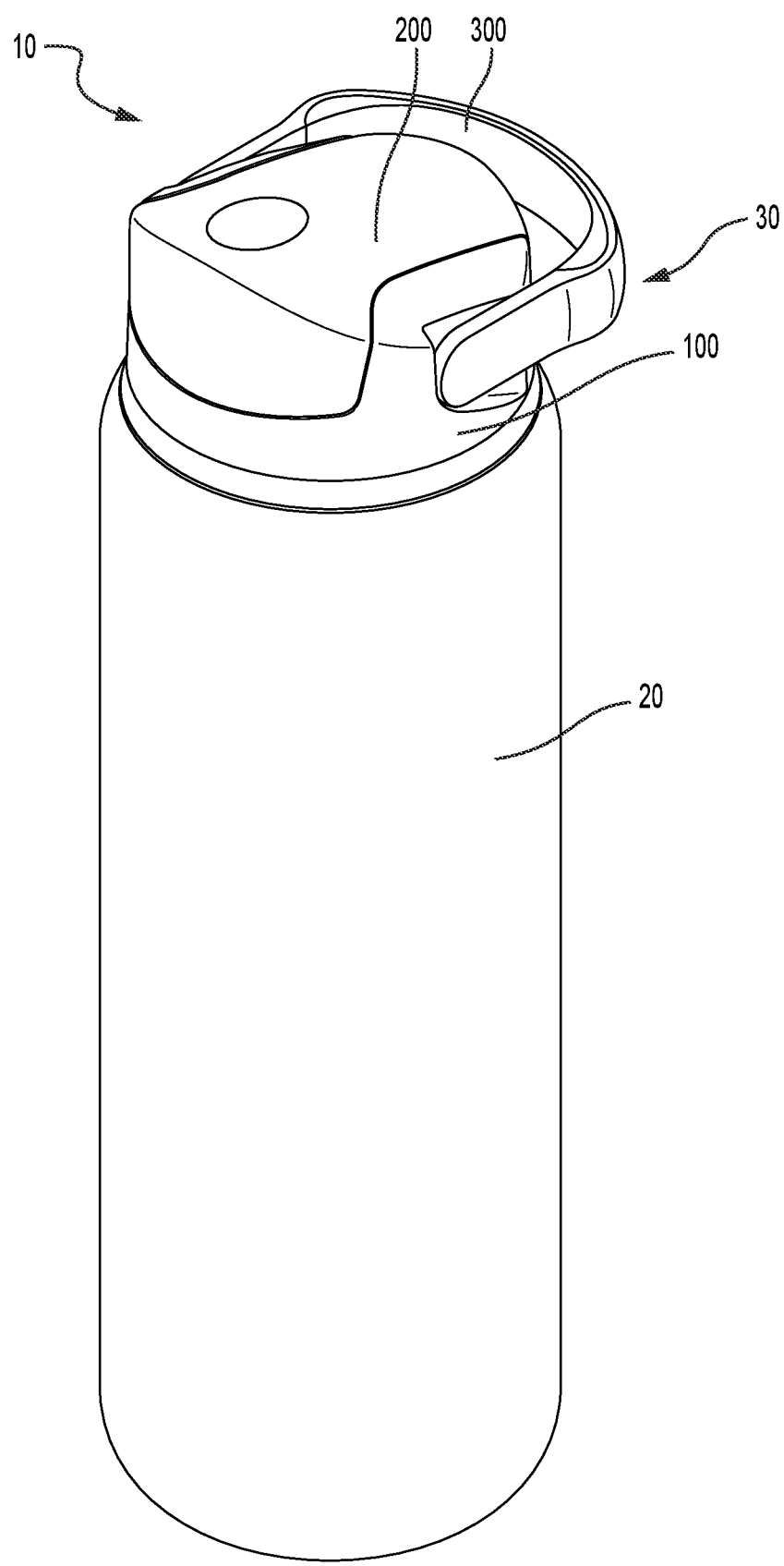
FIG. 4 shows an upper front view of the beverage container of FIG. 1, with the closure in the closed position and the handle in a rearward horizontal position.

In some embodiments, when handle 300 is placed or moved within a first handle range (e.g., a first rotational range spanning from the upright position shown in FIG. 1 to the horizontal position shown in FIG. 4), a user can use handle 300 to carry beverage container 10 without worrying that closure 200 will open. In this first handle range, a latching member 500 (shown, for example, in FIG. 9) retains closure 200 in the closed position.

In some embodiments, when handle 300 is moved beyond the first handle range (e.g., by pivoting handle 300 beyond the horizontal position shown in FIG. 4 toward the declined position shown in FIG. 5), closure 200 automatically opens. As will be discussed in greater detail, moving handle 300 beyond the first handle range may cause latching member 500 to disengage from closure 200 and therefore no longer hold closure 200 in the closed position. A closure biasing member 400 (shown, for example, in FIG. 7) may then push closure 200 to the open position.

In the illustrated embodiment, handle 300 is movable within the first handle range (in which latching member 500 retains closure 200 in the closed position) and is movable beyond the first handle range to open closure 200 by pivoting handle 300 toward a rear of lid 30. However, in other embodiments, handle 300 may be movable within and beyond the first handle range by pivoting handle 300 in another direction. In still other embodiments, handle 300 may be movable within and beyond the first handle range by moving handle 300 in another manner (e.g., by sliding).

In some embodiments, when handle 300 is moved beyond the first handle range, handle 300 may be biased to a position within the first handle range (e.g., to the rearward horizontal position shown in FIG. 4) such that when a user releases handle 300, handle 300 automatically returns to the biased position.

In some embodiments, handle 300 is the only actuation mechanism for opening closure 200.

In some embodiments, returning closure 200 to the closed position may cause closure 200 to again be retained in the closed position. For example, latching member 500 may be biased to a latching position such that when a user closes closure 200, latching member 500 re-engages closure 200 to again retain closure 200 in the closed position.

In some embodiments, lid 30 includes a locking member 700 (shown, for example in FIG. 2) to inhibit closure 200 from moving to the open position. Locking member 700 may be accessible to a user from an outside of beverage container 10 and may be movable between a locked position and an unlocked position. As will be discussed in greater detail, in some embodiments, locking member 700 may inhibit movement of latching member 500 and thereby inhibit opening of closure 200. However, in other embodiments, locking member 700 may directly inhibit movement of closure 200.

FIGS. 7-13 show detailed views of an embodiment for implementing some features as have been described. The specific structures and mechanisms shown and described (here and anywhere else in this document) may not be the only way to accomplish the functions described, and each element may be implemented using other shapes, structures, and appearances than specifically shown and described.

Figure 7:
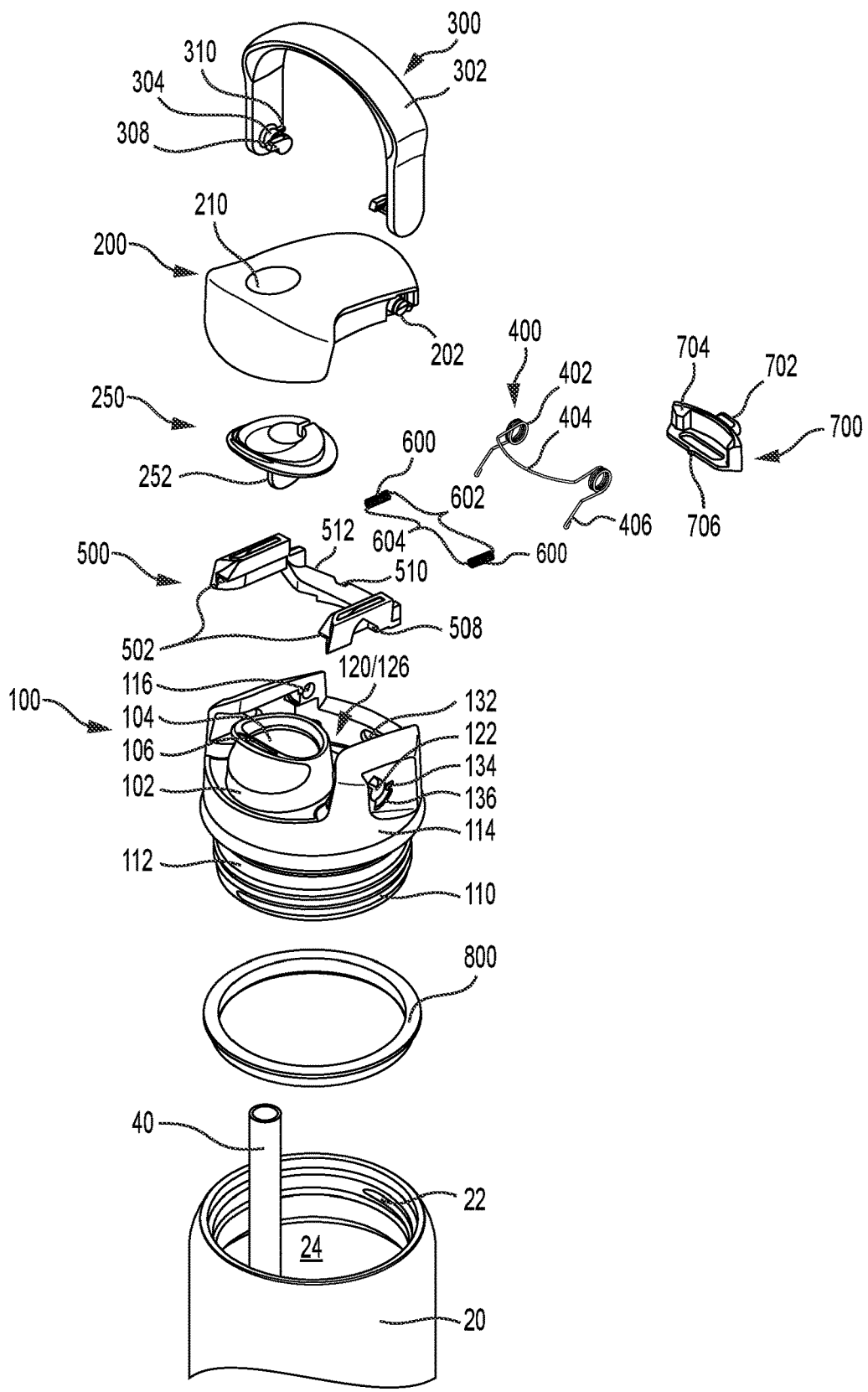
FIG. 7 shows an exploded upper front view of a portion of the beverage container of FIG. 1.
Figure 8:
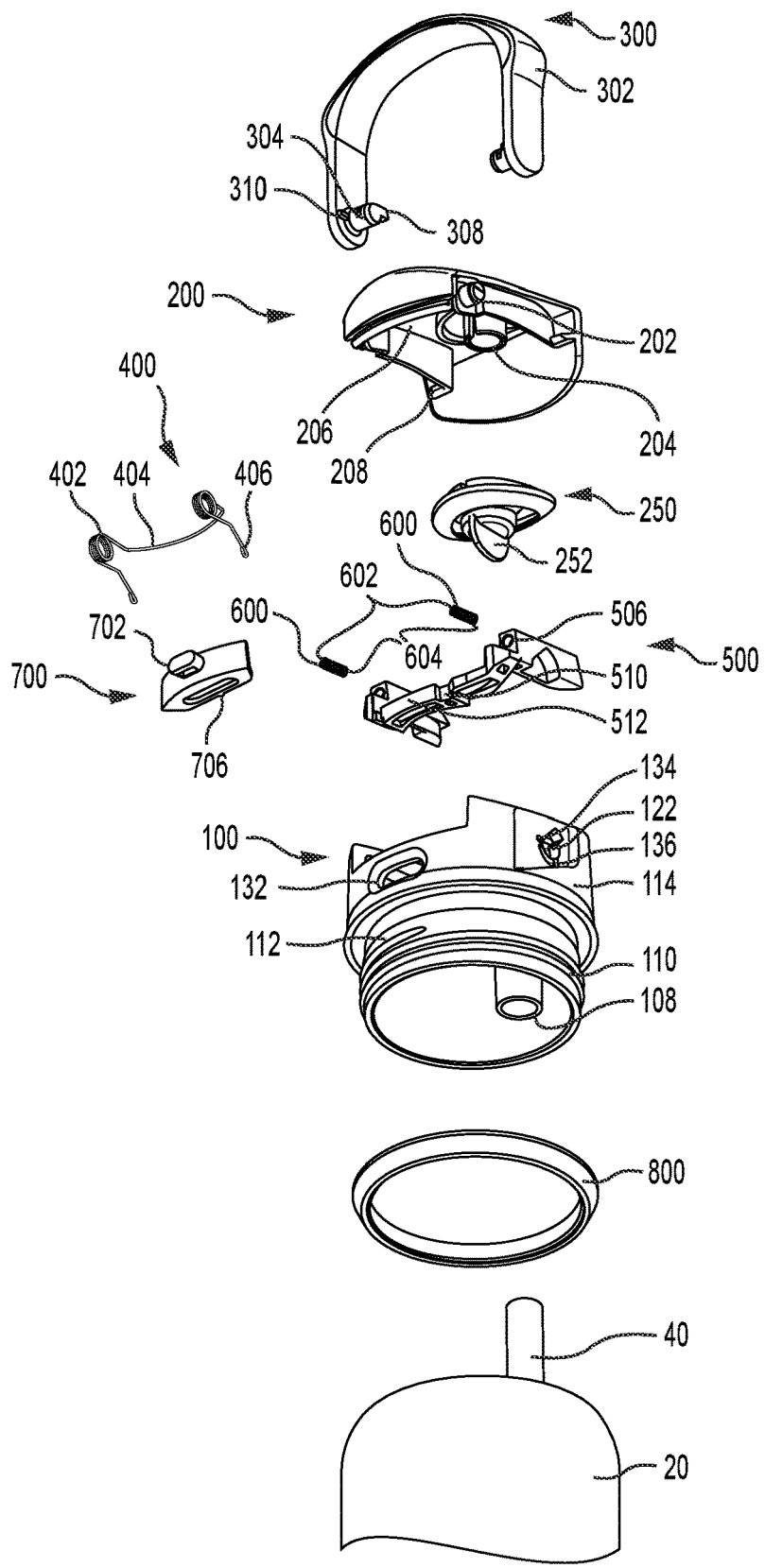
FIG. 8 shows an exploded lower rear view of a portion of the beverage container of FIG. 1.

FIGS. 7 and 8 show exploded views of beverage container 10 according to some embodiments. As shown, lid 30 includes lid base 100, closure 200, sealing member 250, closure biasing member 400, handle 300, latching member 500, latch biasing member 600, locking member 700, and lid sealing member 800. Beverage container 10 may also include vessel 20 and straw 40.

As shown, for example, in FIG. 7, lid base 100 may define a spout 102 through which drinking opening 104 extends. A user may drink a beverage contained within beverage container 10 through drinking opening 104 when lid 30 is assembled with vessel 20. Spout 102 is located near a front edge of lid base 100—offset from a center of lid base 100—so that it is in a comfortable location for a user when the user is drinking from spout 102. In some embodiments spout 102 is a rigid spout.

In some embodiments, a second drinking opening 106 may extend through lid base 100 and/or spout 102. In embodiments in which second drinking opening 106 is provided, a user may drink a beverage contained within beverage container 10 through drinking opening 104 and/or drinking opening 106 when lid 30 is assembled with vessel 20.

In some embodiments, a top end of straw 40 may fit together with a lower portion 108 of drinking opening 106 (e.g., by interference fit around an exterior of lower portion 108 or within an interior of lower portion 108). An inner passageway of straw 40 may be in fluid communication with drinking opening 106. Straw 40 may extend away from a bottom side of lid 30 such that when lid 30 is attached to vessel 20, straw 40 extends into interior 24 of vessel 20 and opens at or near a bottom of interior 24 of vessel 20. In an upright orientation, a lower end of straw 40 may be submerged in a beverage contained within interior 24 of vessel 20. A user may suck on drinking opening 106, which suction will be transmitted through drinking opening 106, through straw 40, and into liquid contained within interior 24 of vessel 20. This will cause such liquid to be drawn up through straw 40 and drinking opening 106 into the user's mouth for consumption. In the illustrated embodiment, straw 40 is in fluid communication with second drinking opening 106. However, in embodiments in which only a single drinking opening 104 is provided, straw 40 may instead be in fluid communication with drinking opening 104.

Straw 40 may be integrally formed as part of lid base 100 or may be a removable component. Straw 40 may be formed of food-grade plastic (e.g., polypropylene, copolyester, the copolymer sold as Eastman Tritan, high-density polyethylene (HDPE), polyoxymethylene (POM), or acrylonitrile butadiene styrene (ABS)), glass, or metal (e.g., steel, stainless steel, aluminum, copper, or titanium).

Lid base 100 may be formed of food-grade plastic (e.g., polypropylene, copolyester, the copolymer sold as Eastman Tritan, high-density polyethylene (HDPE), polyoxymethylene (POM), or acrylonitrile butadiene styrene (ABS)), or metal (e.g., steel, stainless steel, aluminum, copper, or titanium), and may be formed as a single, unitary piece.

Lid base 100 may include attachment mechanism 110 on a lower side wall 112 of lid base 100. Vessel 20 may include a corresponding attachment mechanism 22 near an upper edge of the vessel 20, configured to engage with attachment mechanism 110 to removably attach vessel 20 to lid 30. Attachment mechanisms 110 and 22 may be threaded connectors (as shown in FIG. 7), friction fit connectors, snap-fit connectors, or any other suitable releasable attachment mechanism. The attachment of lid base 100 to vessel 20 is not limited to the arrangement shown in the figures. For example, in some embodiments, lid base 100 may attach over vessel 20 rather than inside vessel 20.

When assembled with vessel 20, lid sealing member 800 may be pressed between lid base 100 and an inner surface of vessel 20, to create a seal between lid 30 and vessel 20. Lid sealing member 800 may be a removable component (e.g., a removable gasket), or may be an integrally-formed part of lid base 100 or vessel 20. Lid sealing member 800 may be formed of a food-grade material suitable to create a seal between lid base 100 and vessel 20.

Figure 6:
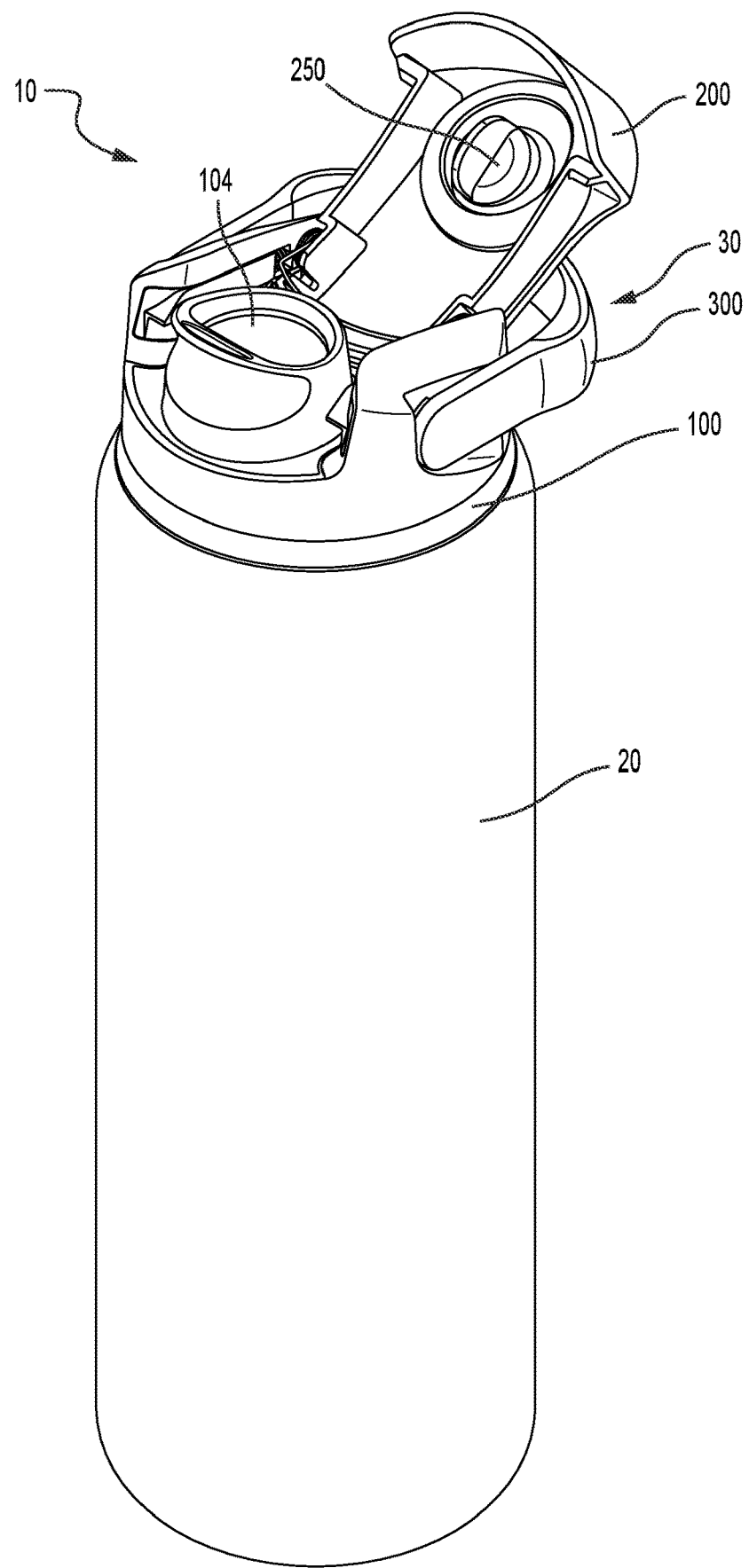
FIG. 6 shows an upper front view of the beverage container of FIG. 1, with the handle in the rearward horizontal position of FIG. 4 and with the closure in the open position.

As mentioned, lid 30 may include closure 200 moveably coupled to lid base 100 and movable between a closed position (as shown, for example, in FIGS. 1-4) and an open position (as shown, for example, in FIGS. 5 and 6). When closure 200 is in the closed position, closure 200 may extend across lid 30 and cover drinking opening 104. When closure 200 is in the open position, closure 200 may not cover drinking opening 104.

When closure 200 is in the closed position, a sealing member 250 may be positioned at least partially between closure 200 and drinking opening 104 to seal drinking opening 104. In the illustrated embodiment, sealing member 250 is removably attached to a portion of closure 200 (e.g., a post 204). However, sealing member 250 may be integrally formed as part of closure 200 or lid base 100 or may be a separate component attached (e.g., permanently or removably attached) to closure 200 or lid base 100. In embodiments in which sealing member 250 is removable from closure 200 or lid base 100, sealing member 250 may include a grip 252 to aid in removing sealing member 250 from closure 200 or lid base 100.

When closure 200 is in the closed position (as shown, for example, in FIGS. 1-4), sealing member 250 may press against a surface surrounding drinking opening 104 to create a seal around drinking opening 104. In embodiments in which a second drinking opening 106 is provided, sealing member 250 may press against a surface surrounding drinking opening 106 to additionally seal drinking opening 106.

Sealing member 250 may have any shape and configuration sufficient to seal drinking opening 104. For example, sealing member 250 may be formed, for example, as a plug or gasket. Sealing member 250 may be formed of a food-grade material suitable to create a seal between lid base 100 and closure 200.

As mentioned, closure 200 may be movably coupled to lid base 100. For example, as shown in FIG. 7, upper side wall 114 of lid base 100 may include receiving portions 116, and closure 200 may include engaging portions 202. Engaging portions 202 of closure 200 may be received into receiving portions 116, thereby enabling closure 200 to pivot about closure axis 50 through receiving portions 116 of lid base 100 and engaging portions 202 of closure 200. In the illustrated embodiment, closure 200 is pivotable relative to lid base 100. However, in other embodiments, closure 200 is movable relative to lid base 100 in another manner such as, for example, by sliding.

Closure 200 may be formed of food-grade plastic (e.g., polypropylene, copolyester, the copolymer sold as Eastman Tritan, high-density polyethylene (HDPE), polyoxymethylene (POM), or acrylonitrile butadiene styrene (ABS)), glass, or metal (e.g., steel, stainless steel, aluminum, copper, or titanium), and may be formed as a single, unitary piece.

In some embodiments, lid base 100 includes latching member 500 to selectively retain closure 200 in the closed position. In such embodiments, lid base 100 may define a latch chamber 120, and latching member 500 may be positioned at least partially within latch chamber 120. Latching member 500 may be movable (e.g., slidable) within latch chamber 120 from a latching position (shown, for example in FIG. 9) to an unlatched position (shown, for example, in FIG. 11).

As will be discussed in greater detail, when latching member 500 is in the latching position and closure 200 is in the closed position (as shown, for example, in FIGS. 9 and 10), latching member 500 may hold closure 200 in the closed position. In some embodiments, latching member 500 may include a latching portion 502, and closure 200 may include a corresponding ledge 208. When closure 200 is in the closed position and latching member 500 is in the latching position (as shown, for example, in FIGS. 9 and 10), latching portion 502 may be positioned above ledge 208 and abut ledge 208 such that ledge 208 and latching portion 502 hold closure 200 in the closed position. As shown in FIG. 7, in some embodiments, latching member 500 may include multiple latching portions 502 (for example, a first latching portion positioned on a right side of lid 30 and a second latching portion positioned on a left side of lid 30), and closure 200 may include multiple ledges 208 corresponding to the latching portions 502 of latching member 500 (for example, a first ledge positioned on a right side of lid 30 and a second ledge positioned on a left side of lid 30). Providing multiple latching portions 502 and ledges 208 may, for example, provide a stronger latching force or provide redundancy such that closure 200 remains closed even if one latch portion is inadvertently released.

Latching member 500 may be formed of food-grade plastic (e.g., polypropylene, copolyester, the copolymer sold as Eastman Tritan, high-density polyethylene (HDPE), polyoxymethylene (POM), or acrylonitrile butadiene styrene (ABS)), glass, or metal (e.g., steel, stainless steel, aluminum, copper, or titanium), and may be formed as a single, unitary piece. In embodiments in which latching member 500 includes multiple latching portions 502, forming latching member as a single, unitary piece may, for example allow for more reliable simultaneous latching and unlatching of latching member 500 and closure 200.

In some embodiments, lid base 100 includes a closure biasing member 400 to bias closure 200 toward the open position. Closure biasing member 400 may bias closure 200, for example, by applying an upward force to a front portion of closure 200 (relative to closure axis 50), by applying a downward force to a rear portion of closure 200 (relative to closure axis 50), or by applying both an upward force to a front portion of closure 200 and a downward force to a rear portion of closure 200. Closure biasing member 400 may be, for example, a torsion spring (as shown in FIG. 7), a compression spring, or an elastic material.

The illustrated closure biasing member 400 (shown, for example, in FIG. 7) is a torsion spring. Torsion spring 400 includes loop-shaped portion 402, first arm(s) 404, and second arm(s) 406. A portion of first arm(s) 404 may contact a lower surface 206 of closure 200, and a portion of second arm(s) 406 may contact an upper surface of lid base 100. When closure 200 is in the open position, first arm(s) 404 of torsion spring 400 extends in a first direction generally toward the rear of lid base 100, and second arm(s) 406 of torsion spring 400 extend in a second direction generally toward the front of lid base 100. When closure 200 is in the closed position, first arm(s) 404 and second arm(s) 406 push closure 200 toward the open position.

In embodiments in which closure biasing member 400 is provided, the force applied by latching member 500 when latched may overcome the biasing force of closure biasing member 400 such that closure 200 is held in the closed position despite the biasing force applied by closure biasing member 400.

In some embodiments, lid base 100 may include latch biasing member 600 to bias latching member 500 toward the latching position. Latch biasing member 600 may bias latching member 500, for example, by applying a forward force to a portion of latching member 500, or by applying both a forward force to a rear portion of latching member 500 and a rearward force to a front portion of latching member 500. Closure biasing member 400 may be, for example, a compression spring (as shown in FIG. 7) a torsion spring, or an elastic material.

The illustrated latch biasing member 600 (shown, for example, in FIG. 7) is a compression spring. A first end 602 of compression spring 600 may contact a forward-facing surface 124 of lid base 100, and a second end 604 of compression spring 600 may contact a rearward-facing surface 506 of latching member 500. When latching member 500 is in the unlatched position, compression spring 600 pushes latching member 500 forward toward the latching position by applying a force on rearward-facing surface 506 of latching member 500.

Figure 10:
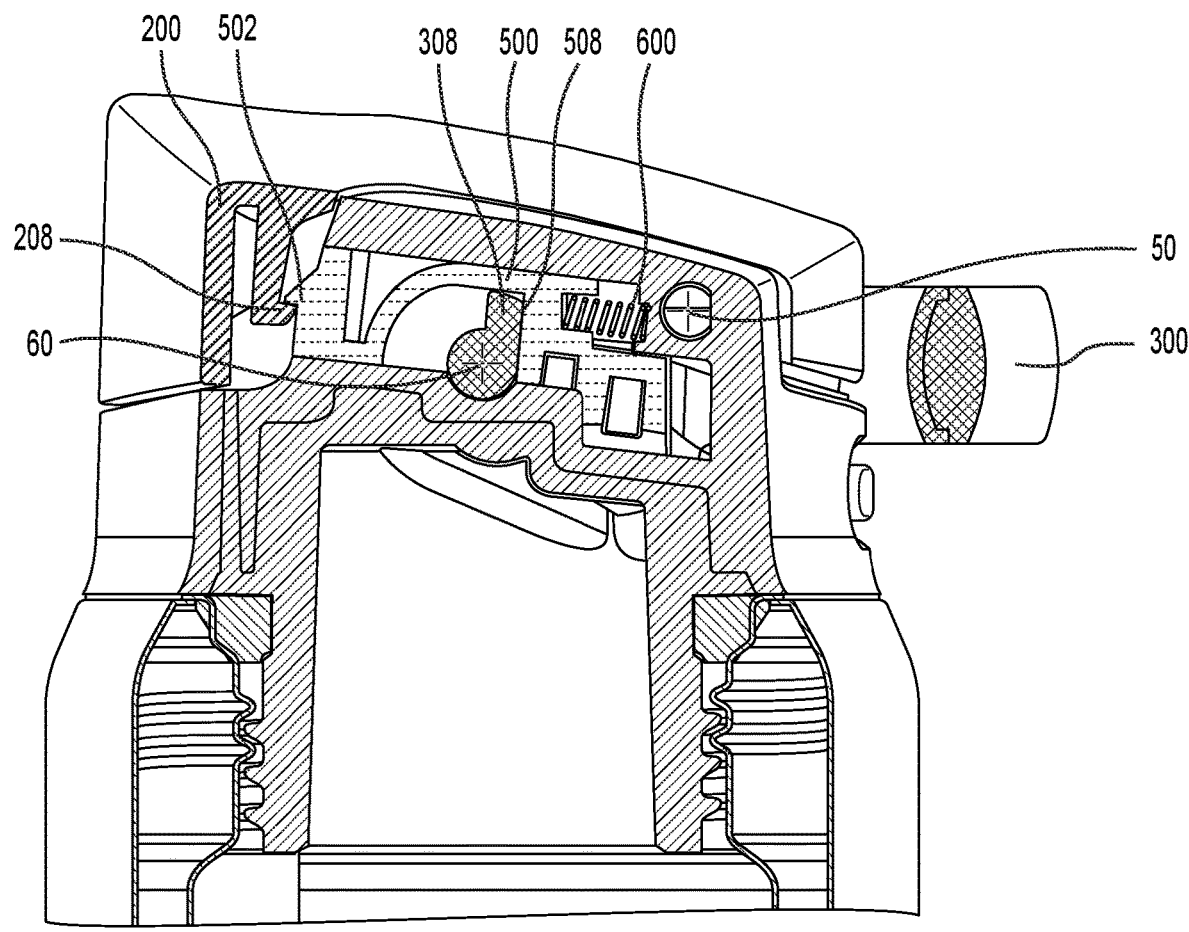
FIG. 10 shows a sectional view of a portion of the beverage container of FIG. 1, with the closure in the closed position and the handle in the rearward horizontal position of FIG. 4, taken at the position of line IX-IX' of FIG. 3.
Figure 11:
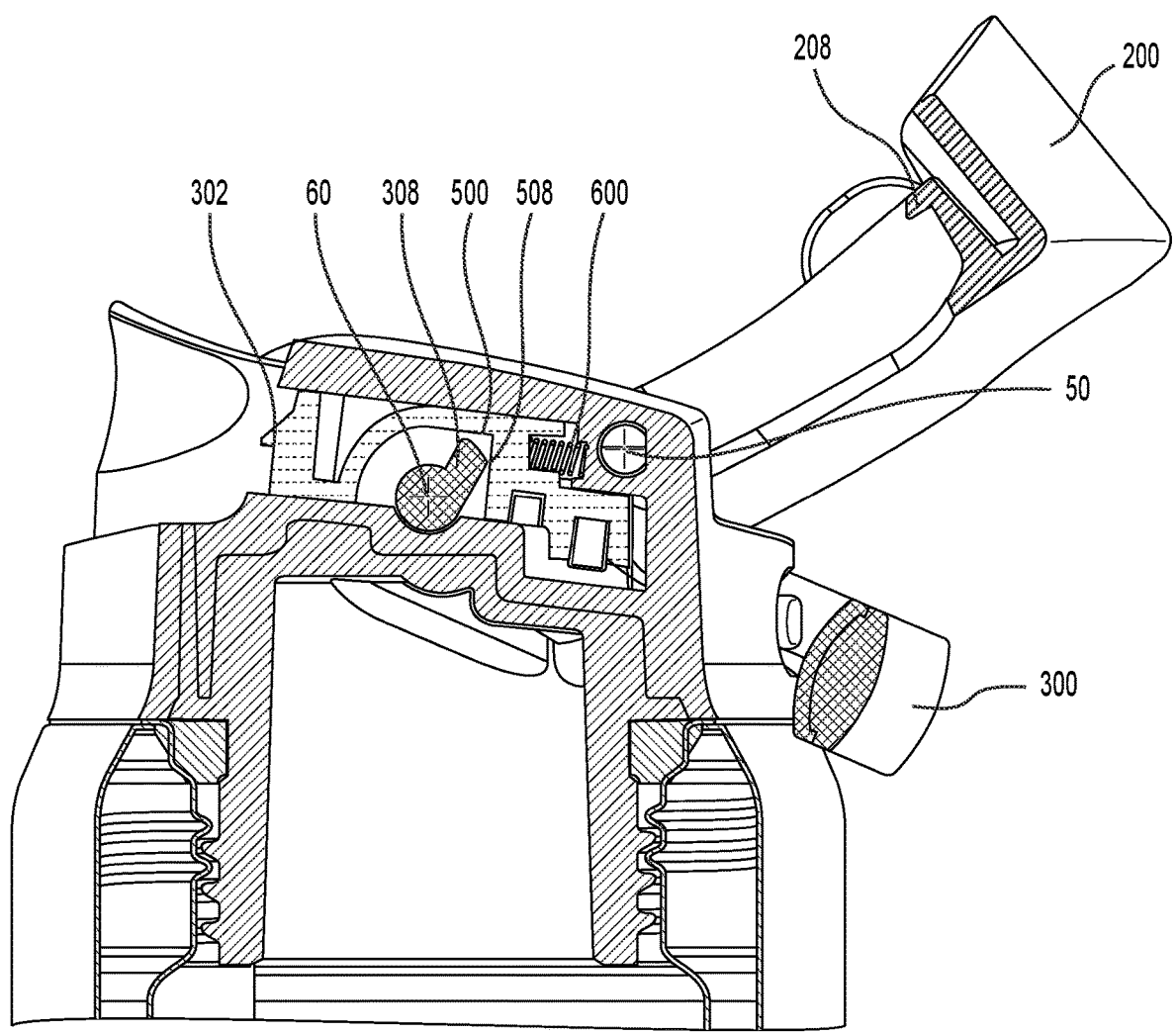
FIG. 11 shows a sectional view of a portion of the beverage container of FIG. 1, with the handle in the rearward declined position of FIG. 5 and with the closure in the open position, taken at the position of line IX-IX' of FIG. 3.

In some embodiments, a user may apply a force to a portion of latching member 500 to move (e.g., slide) latching member 500 to the unlatched position. Generally, the force applied by a user may overcome the biasing force of latch biasing member 600 if a biasing member 600 is provided. In some embodiments, a user may apply a force to a portion of latching member 500 indirectly. For example, as shown in FIG. 11, and discussed in more detail below, moving handle 300 beyond a first handle range (e.g., by pivoting handle 300 from the first position shown in FIG. 10 to the position shown in FIG. 11) may cause latching member 500 to move from the latching position (shown, for example, in FIG. 10) to the unlatched position (shown, for example, in FIG. 11).

Latching member 500 may be formed of any suitable material (e.g., polypropylene, copolyester, the copolymer sold as Eastman Tritan, high-density polyethylene (HDPE), polyoxymethylene (POM), or acrylonitrile butadiene styrene (ABS)), or metal (e.g., steel, stainless steel, aluminum, copper, or titanium), and may be formed as a single, unitary piece.

As mentioned, handle 300 may be moveably coupled to lid base 100. As illustrated in FIG. 7, for example, upper side wall 114 of lid base 100 may include receiving portions 122, and handle 300 may include engaging portions 304 corresponding to receiving portions 122. Engaging portions 304 of handle 300 may be received into receiving portions 122, thereby enabling handle 300 to pivot about a handle axis 60 through the engaging portions 304 of handle 300. In the illustrated embodiment, handle 300 is pivotable relative to lid base 100. However, in other embodiments, handle 300 is movable relative to lid base 100 in another manner such as, for example, by sliding.

In some embodiments, closure 200 and the handle 300 are independently rotatable. In some embodiments, closure axis 50 (the axis of rotation of closure 200) and handle axis 60 (the axis of rotation of handle 300) may be parallel. However, in other embodiments, the axes may not be parallel. In some embodiments, closure axis 50 is spaced apart from handle axis 60.

In some embodiments, the connection between handle 300 and lid base 100 is strong enough to bear a weight of at least 14 oz (the approximate weight of some filled beverage containers).

As will be discussed in more detail below, when handle 300 is placed or moved within a first handle range (e.g., a first rotational range spanning from the upright position shown in FIG. 1 to the horizontal position shown in FIG. 4), a user can use handle 300 to carry beverage container 10 without worrying that closure 200 will open. In the upright position, handle 300 extends away from handle axis 60 in a direction opposite vessel 20, so that the weight of vessel 20 hangs below handle 300 when carried by handle 300 in the upright position. In the horizontal position, handle 300 may be rotated approximately 90 degrees from the upright position. In this first handle range, latching member 500 (shown, for example, in FIG. 9) holds closure 200 in the closed position. In some embodiments, when handle 300 is moved beyond the first handle range (e.g., by pivoting handle 300 beyond the horizontal position shown in FIG. 4 toward the declined position shown in FIG. 5), closure 200 automatically opens.

Handle 300 may be formed of any suitable material (e.g., polypropylene, copolyester, the copolymer sold as Eastman Tritan, high-density polyethylene (HDPE), polyoxymethylene (POM), or acrylonitrile butadiene styrene (ABS)), or metal (e.g., steel, stainless steel, aluminum, copper, or titanium), and may be formed as a single, unitary piece.

In some embodiments, lid 30 includes a locking member 700 to inhibit closure 200 from moving to the open position. In such embodiments, lid base 100 may define a lock chamber 126 (shown, for example, in FIG. 7), and locking member 700 may be positioned at least partially within lock chamber 126. Locking member 700 may be movable (e.g., rotatable) within lock chamber 126 from a locked position to an unlocked position.

As will be discussed in more detail below, when locking member 700 is in the locked position, locking member 700 inhibits closure 200 from opening (e.g., by inhibiting latching member 500 from moving from the latching position to the unlatched position). When locking member 700 is in the unlocked position, locking member 700 does not inhibit closure 200 from opening (e.g., by allowing latching member 500 to move freely from the latching position to the unlatched position).

Locking member 700 may be formed of any suitable material (e.g., polypropylene, copolyester, the copolymer sold as Eastman Tritan, high-density polyethylene (HDPE), polyoxymethylene (POM), or acrylonitrile butadiene styrene (ABS)), or metal (e.g., steel, stainless steel, aluminum, copper, or titanium), and may be formed as a single, unitary piece.

Vessel 20 may be any type of vessel. Vessel 20 may be cylindrical (as shown, for example, in FIGS. 1-6) or have another exterior or interior shape. In some embodiments, vessel 20 may be double-walled to enhance thermal insulative properties of beverage container 10. In some embodiments, an area between vessel 20's double walls may be hermetically sealed and may form at least a partial vacuum. In some embodiments, vessel 20 may be formed of stainless steel. In some embodiments, vessel 20 may be formed of another food-grade material, such as a food-grade plastic (e.g., polypropylene, copolyester, the copolymer sold as Eastman Tritan, high-density polyethylene (HDPE), polyoxymethylene (POM), or acrylonitrile butadiene styrene (ABS)), glass, or another metal (e.g., steel, aluminum, copper, or titanium).

FIGS. 9-13 are cross-sectional views showing relative positions of certain components of lid 30 during operation. As mentioned above, during operation a user may move handle 300 beyond a first handle range (e.g., beyond a first rotational range) in order to open closure 200. For example, a user may move handle 300 from a first position within the first handle range to a second position outside the first handle range in order to open closure 200.

Figure 9:
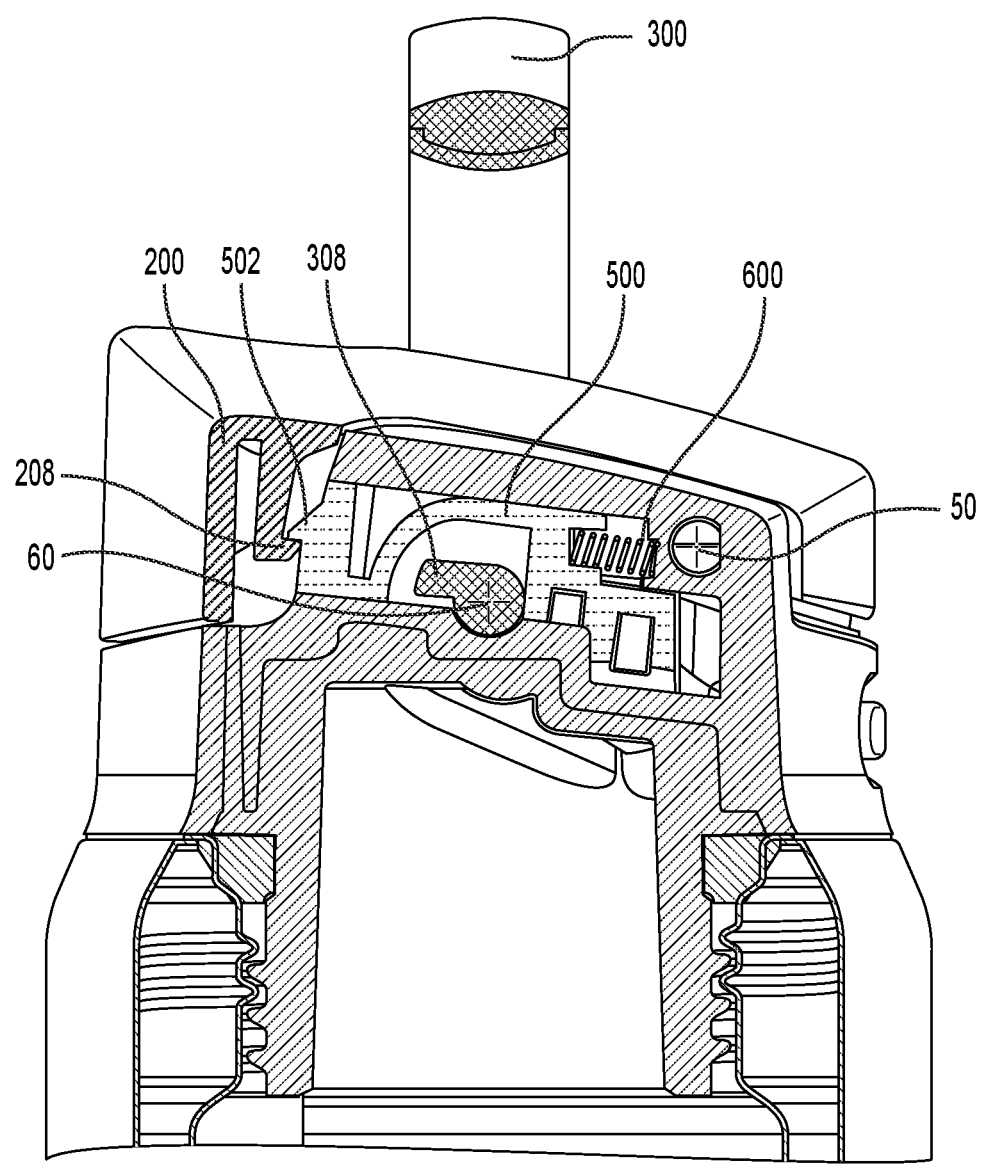
FIG. 9 shows a sectional view of a portion of the beverage container of FIG. 1, with the closure in the closed position and the handle in the upright position, taken at the position of line IX-IX' of FIG. 3.
Figure 12:
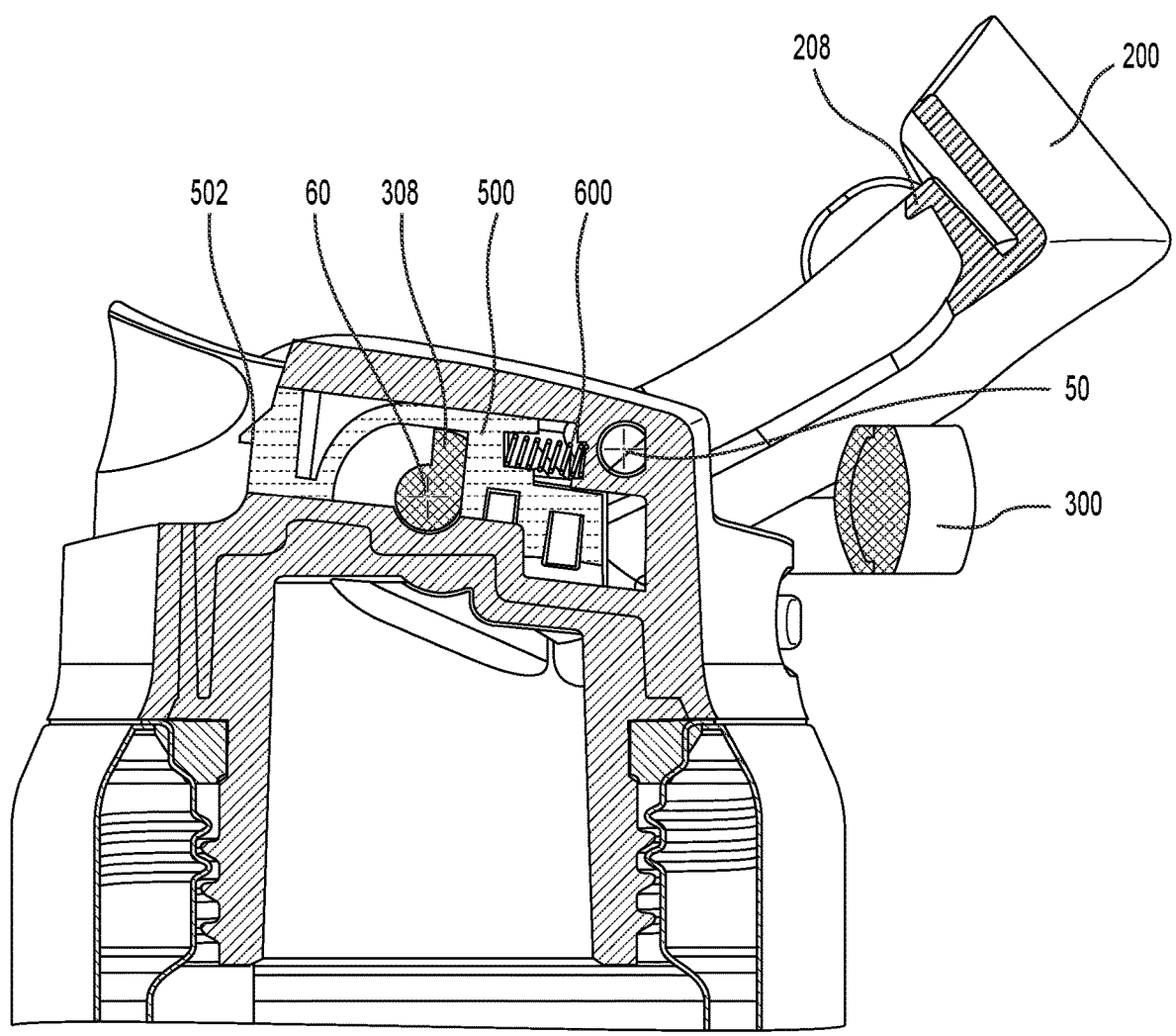
FIG. 12 shows a sectional view of a portion of the beverage container of FIG. 1, with the handle in the rearward horizontal position of FIG. 4 and with the closure in the open position, taken at the position of line IX-IX' of FIG. 3.

In FIG. 9, closure 200 is in a closed position and handle 300 is in a carrying position within the first handle range. In FIG. 10, handle 300 has been moved to another position (e.g., a rearward horizontal position) within the first handle range. In FIG. 11, handle 300 has been moved to a position (e.g., a rearward declined position) outside the first handle range, thereby releasing closure 200 and closure 200 has moved to the open position. In FIG. 12, handle 300 has returned to a position within the first handle range (e.g., the rearward horizontal position). The sections in FIGS. 9-12 are taken vertically at the position of line IX-IX' of FIG. 3.

In FIG. 9, closure 200 is in a closed position and handle 300 is in a carrying position within the first handle range. Latching member 500 is also in the latching position. With closure 200 in the closed position and latching member 500 in the latching position, latching portion 502 of latching member 500 engages ledge 208 of closure 200, thereby holding latching member 500 in the closed position.

With closure 200 in the closed position and handle 300 in the carrying position, a user can place a finger or several fingers through carry loop 302 of handle 300 in order to carry beverage container 10.

In some embodiments, lid 30 and handle 300 may include registration features to hold handle 300 in a carrying position (so that, for example, a user does not inadvertently move handle 300 beyond the first handle range) and/or to provide tactile and/or audible feedback to a user when moving handle 300. For example, as shown in FIG. 7, lid base 100 may include registration recesses 134, 136 and handle 300 may include registration bumps 310. When handle 300 is in its carrying position relative to lid base 100 (as in FIG. 9) registration bumps 310 of handle 300 are registered within recesses 134 of lid base 100. This registration helps inhibit inadvertent movement (e.g., rearward rotation) of handle 300 relative to lid base 100.

In some embodiments, handle 300 may be moved (e.g., rotated) to another position within the first handle range (e.g., to the rearward horizontal position shown in FIG. 10). When handle 300 is moved to the position shown in FIG. 10, registration bumps 310 are instead received within recesses 136 of lid base 100. In traveling to this location, registration bumps 310 pressed against a portion of lid base 100, thereby resiliently deforming lid base 100, registration bumps 310, or both, until registration bumps 310 and recesses 136 were aligned. Once registration bumps 310 and recesses 136 were aligned, registration bumps 310 sprung into recesses 136. The springing movement of registration bump 310 into recesses 136 may be felt, heard, or both by a user, and thus can provide tactile feedback, audible feedback, or both so that the user knows that handle 300 has moved out of the carrying position.

In the illustrated embodiment, registration bumps 310 and recesses 134, 136 are positioned such that multiple registration bumps 310 and recesses 134, 136 (e.g., on left and right sides of lid 30) align simultaneously. However, in other embodiments, only a single registration bump 310 and recess 134 (e.g., only a left side or only a right side) may align at once. Similarly, in other embodiments, only a single registration bump 310 and recess 136 (e.g., only a left side or only a right side) may align at once.

The registration features of lid base 100 and handle 300 are not limited to the arrangement shown in the figures. For example, in the illustrated embodiment, lid base 100 includes recesses and handle 300 includes registration bumps. However, handle 300 may include recesses and lid base 100 may include registration bumps.

Also, for example, in the illustrated embodiment, registration bumps 310 and recesses 134 inhibit movement of handle 300 from a vertical position. However, in other embodiments, bumps 310 and recesses 134 may be arranged to inhibit movement of handle 300 from a different position (e.g., a position in which handle is angled relative to vertical). In other embodiments, additional registration features may be provided to inhibit movement of handle 300 from several different positions (e.g., a vertical position and a position in which handle 300 is angled relative to vertical).

In some embodiments, registration features may not be provided on lid base 100 or handle 300. In such embodiments, a user may still be able to place handle 300 in an upright carrying position or in another position to carry beverage container 10.

As mentioned, in some embodiments, handle 300 may be movable (e.g., pivotable) within a first handle range (e.g. spanning from the upright position shown in FIG. 9 to the rearward horizontal position shown in FIG. 10) while closure 200 is retained in the closed position. In such embodiments, when handle 300 is within the first handle range, a user can still use handle 300 to carry beverage container 10 without worrying that closure 200 will open.

In FIG. 10, handle 300 has been moved to another position within the first handle range (e.g., by rotating handle 300 about handle axis 60 in a first rotational direction from the position shown in FIG. 9 toward a rear of lid 30). In FIG. 10, closure 200 remains in the closed position and latching member 500 remains in the latching position. With closure 200 in the closed position and latching member 500 in the latching position, latching portion 502 of latching member 500 engages ledge 208 of closure 200, thereby holding closure 200 in the closed position.

In some embodiments, handle 300 can be moved beyond the first handle range (e.g., pivoted beyond the horizontal position shown in FIG. 10 toward the declined position shown in FIG. 11) to open closure 200. As shown, for example, in FIGS. 10 and 11, when handle 300 reaches the end of the first handle range, projection 308 of handle 300 engages abutment surface 508 of latching member 500. As handle 300 pivots beyond the first handle range, projection 308 of handle 300 pushes abutment surface 508 of latching member 500, thereby causing latching member 500 to move away from the latching position. Once latching member 500 moves away from the latching position, latching portion 502 of latching member 500 no longer engages ledge 208 of closure 200 to hold closure 200 in the closed position. In the illustrated embodiment, projection 308 of handle 300 directly engages abutment surface 508 of latching member 500 to push latching member 500 away from the latching position. However, in other embodiments, projection 308 may push latching member 500 away from the latching position through an intervening mechanical linkage.

In FIG. 11, handle 300 has been moved (e.g., pivoted) beyond the first handle range. In other words, handle 300 has been moved from a first handle position (within the first handle range) to a second handle position (beyond the first handle range). In response to handle 300 moving beyond the first handle range (e.g., to the rearward declined position shown in FIG. 11), latching member 500 base moved from the latching position to the unlatched position.

As discussed, in some embodiments, a closure biasing member 400 may bias closure 200 to in open position. In such embodiments, once latching portion 502 of latching member 500 no longer engages ledge 208 of closure 200 to hold closure 200 in the closed position, closure 200 automatically moves to the open position.

In the illustrated embodiment, handle 300 can be moved beyond the first handle range by rotating handle 300 in a first rotational direction about handle axis 60 (for example toward a rear of lid 30). That is, handle 300 cannot be moved beyond the other end of the first handle range by rotating handle 300 in a second rotational direction opposite the first rotational direction. However, in other embodiments, handle 300 may be moved beyond either end of the first handle range to release closure 200. In such embodiments, handle 300 may be rotated beyond a first end of the first handle range by rotating handle 300 in a first rotational direction, and handle 300 may be rotated beyond a second end of the first handle range opposite the first end by rotating handle 300 in a second rotational direction opposite the first rotational direction.

In some embodiments, a latch biasing member 600 may bias latching member 500 to the latching position. In such embodiments, once a user releases handle 300, latch biasing member 600 may push latching member 500 toward the latching position.

In some embodiments, once a user releases handle 300, handle 300 may return to a position within the first handle range (e.g., by rotating in a direction opposite the direction handle 300 rotated to release closure 200). For example, in the illustrated embodiment, the movement of latching member 500 from the unlatched position to the latching position (due to latch biasing member 600) causes abutment surface 508 of latching member 500 to push projection 308 of handle 300, thereby causing handle 300 to return to a position within the first handle range (e.g., the rearward horizontal position shown in FIG. 12). In the illustrated embodiment, abutment surface 508 of latching member 500 directly engages projection 308 of handle 300 to return handle 300 to a position within the first handle range. However, in other embodiments, latching member 500 may push handle 300 to a position within the first handle range through an intervening mechanical linkage.

In the illustrated embodiment, handle 300 is pivotable within a first handle range that spans 90 degrees from the upright handle position (shown in FIG. 9) to the rearward horizontal position (shown in FIG. 10) while latching member 500 retains closure 200 in the closed position. However, lid 30 may be configured to allow handle 300 to rotate more or less than shown in the figures while latching member 500 retains closure 200 in the closed position. For example, in some embodiments, the first handle range may extend 180 degrees.

Alternatively or additionally, lid 30 may be configured to allow handle to rotate to a position farther forward than the vertical position shown in FIG. 9 while latching member 500 retains closure 200 in the closed position and/or to a position farther rearward than the rearward horizontal position shown in FIG. 10 while latching member 500 retains closure 200 in the closed position. For example, in some embodiments, the first handle range may include a position in which handle 300 is rotated toward the front of lid 30 (e.g., to a forward horizontal position or to a forward declined position). As another example, in some embodiments, the first handle range may include a position in which handle 300 is rotated toward the rear of lid 30 beyond the horizontal position shown in FIG. 10.

In FIG. 12, closure 200 has pivoted more than 90 degrees between the closed position and the open position. However, closure 200 may be configured to rotate more or less than shown in the figures. For example, closure 200 may be configured to rotate 90 degrees or 180 degrees.

In the illustrated embodiment, handle 300 can be moved beyond the first handle range by rotating handle 300 in a first rotational direction, and closure 200 moves in the same rotational direction when moving from the closed position to the open position. However, closure 200 may be configured to move in a different direction when moving from the closed position to the open position.

In some embodiments, a user may push closure 200 to the closed position (e.g., by pivoting closure 200 in a rotation direction opposite the direction closure 200 pivoted when moving from the closed position to the open position). In embodiments in which latching member 500 is biased toward the latching position, pushing closure 200 to the closed position may cause latching member 500 to again engage closure 200, thereby retain closure 200 in the closed position once again. In some embodiments, an indicia 210 (e.g., an indentation or a printed marking) may be provided on a top surface 212 of closure 200 to indicate to a user that the user may push closure 200 to return closure 200 to the closed position.

Figure 13:
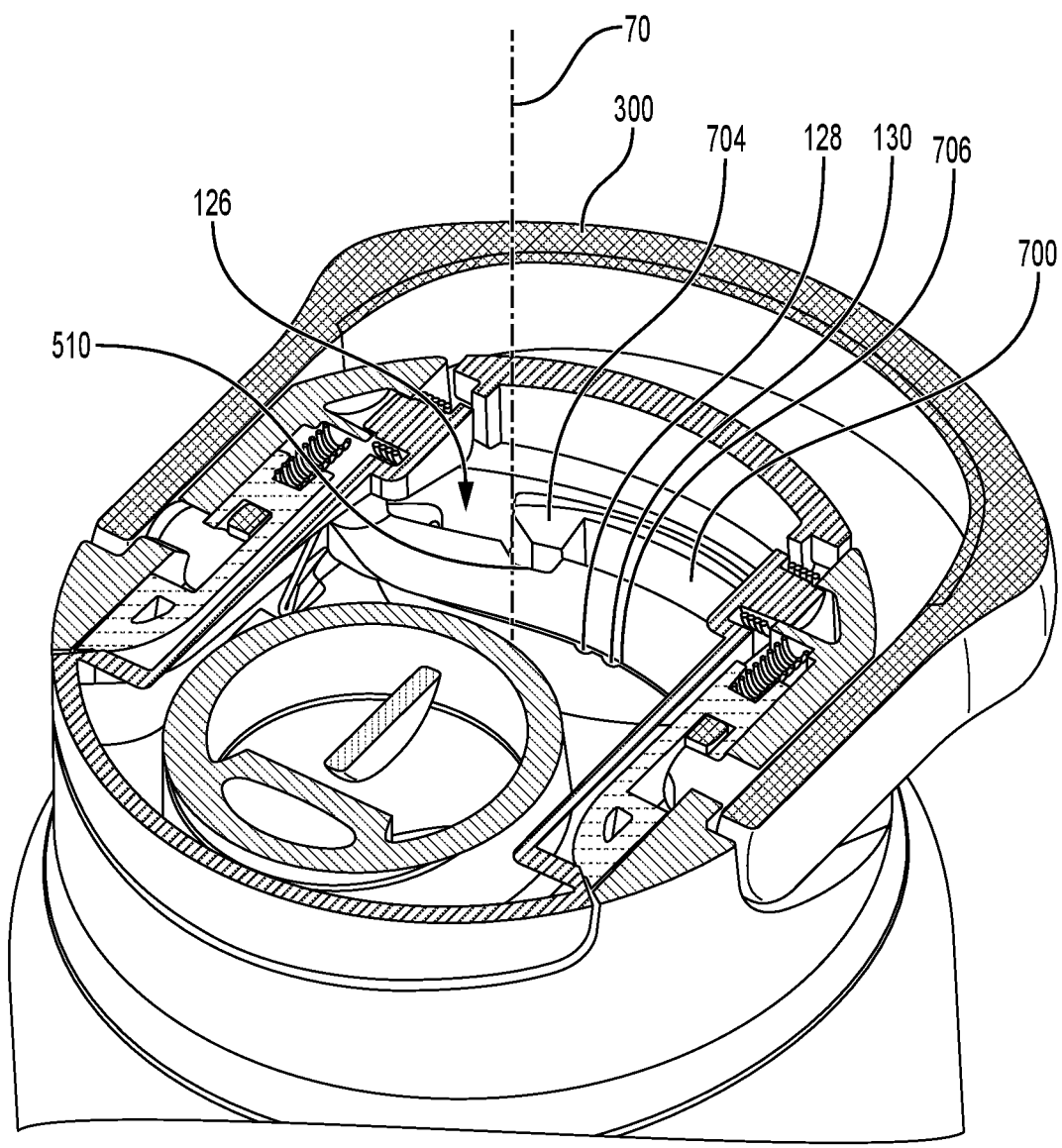
FIG. 13 shows a sectional view of a portion of the beverage container of FIG. 1, with a locking member of the beverage container in an unlocked locked position, taken at the position of line XIII-XIII' of FIG. 3.

In some embodiments, a user may place lid 30 in a locked configuration in which latching member 500 is inhibited from moving from the latching position to the unlatched position and/or closure 200 is prevented from moving to the open position. FIG. 13 shows relative positions of portions of lid base 100, closure 200, latching member 500, locking member 700, and other components of lid 30 when lid 30 is in unlocked configuration.

As mentioned, lid base 100 may define a lock chamber 126, and locking member 700 may be positioned at least partially within lock chamber 126. Locking member 700 may be movable within lock chamber 126 from a locking position to an unlocked position. For example, as shown in FIG. 13, locking member 700 may be rotatable about lock axis 70.

In some embodiments, a portion of locking member 700 (e.g., nub 702, shown, for example, in FIG. 8) may protrude through an opening 132 in lid base 100 so that a user can engage locking member 700 from the exterior of lid 30. A user may move locking member 700 between positions (e.g., from an unlocked position to a locked position) by engaging nub 702 and sliding locking member 700 (e.g., in a counter-clockwise direction about lock axis 70, viewed from the top of lid 30).

When locking member 700 is in the unlocked position (as shown, for example, in FIG. 10) a protrusion 704 of locking member 700 may align with a compartment 510 provided in latching member 500 such that latching member 500 is free to slide toward a rear of lid 30 to the unlatched position. When locking member 700 is in the locked position, protrusion 704 abuts a rear wall 512 of latching member 500 (as opposed to being aligned with compartment 510 of latching member 500) such that the abutment of protrusion 704 and rear wall 512 inhibits movement of latching member 500 toward the unlatched position.

In some embodiments, locking member 700 may include multiple protrusions 704 (for example, a first protrusion on a right side of lid 30 and a second protrusion on a left side of lid 30), and latching member 500 may include multiple compartments (for example, a first compartment on a right side of lid 30 and a second compartment on a left side of lid 30) positioned to align with the multiple protrusions when locking member 700 is in the unlocked position. Providing multiple protrusion 704 and compartments 510 may, for example, provide a stronger lock.

In some embodiments, locking member 700 and lid base 100 may include registration features to hold locking member 700 in a locked or unlocked position and/or to provide tactile and/or audible feedback to a user when moving locking member 700. For example, locking member 700 may include a registration bump 706 (shown, for example, in FIG. 7) and lid base 100 may include registration recesses 128, 130 (shown, for example, in FIG. 13). When locking member 700 is in the unlocked position, as shown in FIG. 13, registration bump 706 of locking member 700 is registered within recesses 130 of lid base 100. This registration helps inhibit inadvertent movement (e.g., rotation) of locking member 700 relative to lid base 100 (and latching member 500).

When locking member 700 is moved (e.g., rotated) to the locked position, registration bump 706 is instead received within recess 128 of lid base 100. In traveling to this location, registration bump 706 pressed against a portion of lid base 100, thereby resiliently deforming lid base 100, registration bump 706, or both, until registration bumps 706 and recess 128 were aligned. Once registration bump 706 and recess 128 were aligned, registration bumps 706 sprung into recess 128. The springing movement of registration bump 706 into recess 128 may be felt, heard, or both by a user, and thus can provide tactile feedback, audible feedback, or both so that the user knows that locking member 700 has moved out of carrying position.

The registration features of lid base 100 and locking member 700 are not limited to the arrangement shown in the figures. For example, in the illustrated embodiment, lid base 100 includes recesses and locking member 700 includes a registration bump. However, locking member 700 may include recesses and lid base 100 may include a registration bump.

It is to be appreciated that the Detailed Description section, and not the Summary and Abstract sections, is intended to be used to interpret the claims. The Summary and Abstract sections may set forth one or more but not all exemplary embodiments of the disclosed invention(s) as contemplated by the inventor(s), and thus, are not intended to limit the disclosed invention(s) and the appended claims in any way.

The foregoing description of the specific embodiments will so fully reveal the general nature of the claimed invention that others can, by applying knowledge within the skill of the art, readily modify and/or adapt for various applications such specific embodiments, without undue experimentation, without departing from the general concept of the claimed invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the claimed invention should not be limited by any of the above-described exemplary embodiments, but should be defined only in accordance with the claims and their equivalents.

What is claimed is:

1. A lid for a beverage container, the lid comprising:
a lid base defining a drinking opening therethrough;
a closure coupled to the lid base, the closure movable between a closed position in which the closure covers the drinking opening and an open position in which the closure does not cover the drinking opening;
a latching member coupled to the lid base, the latching member configured to selectively retain the closure in the closed position; and
a handle coupled to the lid base, the handle movable between a first handle position and a second handle position,
wherein, in response to the handle moving from the first handle position to the second handle position, the latching member moves from a latching position to an unlatched position,
wherein, in the latching position, the latching member retains the closure in the closed position when the closure is in the closed position,
wherein, in the unlatched position, the latching member does not retain the closure, and
wherein the closure is biased toward the open position such that the closure automatically moves from the closed position to the open position when the latching member moves to the unlatched position;
wherein when the handle moves from the first handle position to the second handle position, a portion of the handle pushes the latching member to the unlatched position.

2. The lid of claim 1, wherein the handle is a carry loop.

3. The lid of claim 1, wherein the handle rotates about a handle rotation axis to move between the first handle position and the second handle position.

4. The lid of claim 3, wherein the closure rotates about a closure rotation axis to move between the closed position and the open position, and
wherein the closure and the handle are independently rotatable.

5. The lid of claim 3, wherein the closure rotates about a closure rotation axis to move between the closed position and the open position, and
wherein the handle rotation axis is spaced apart from the closure rotation axis.

6. The lid of claim 1, wherein when the handle is in the second handle position, the handle extends from the lid body at a downward angle.

7. The lid of claim 1, wherein when the handle is in the first handle position, registration features of the handle and of the lid base cooperate to resist rotation of the handle relative to the lid base.

8. The lid of claim 1, wherein the handle is movable among the first handle position, the second handle position, and a third handle position, and
wherein the third handle position is a carrying position.

9. The lid of claim 1, wherein when the handle is in the second handle position, the handle extends from the lid body at a downward angle, and
wherein when the handle is in the third handle position, the handle extends vertically from the lid body.

10. The lid of claim 1, wherein, between the first handle position and the second handle position, the handle is biased to the first handle position.

11. The lid of claim 1, wherein the latching member slides linearly to move between the latching position and the unlatched position.

12. The lid of claim 1, wherein the handle rotates about an axis to move between the first handle position and the second handle position, and
wherein the latching member slides linearly to move between the latching position and the unlatching position.

13. The lid of claim 1, wherein the latching member comprises a first latching portion positioned on a right side of the lid and a second latching portion positioned on a left side of the lid.

14. The lid of claim 1, wherein the latching member is biased toward the latching position.

15. The lid of claim 14, wherein in response to the latching member moving from the unlatched position to the latching position, the handle moves from the second handle position to the first handle position.

16. The lid of claim 1, further comprising a lock movable between a locked position, in which movement of the latching member is inhibited by the lock, and an unlocked position, in which movement of the latching member is not inhibited by the lock.

17. The lid of claim 1, further comprising a lock movable between a locked position, in which movement of the handle is inhibited by the lock, and an unlocked position, in which movement of the handle is not inhibited by the lock.

18. The lid of claim 1, wherein the handle is the only actuation mechanism for unlatching the closure.

19. A beverage container comprising:
the lid of claim 1; and
a vessel,
wherein the lid is configured to attach to and close an opening of the vessel, to contain a beverage therein.

20. A lid for a beverage container, the lid comprising:
a lid base defining a drinking opening therethrough;
a closure coupled to the lid base, the closure movable between a closed position in which the closure covers the drinking opening and an open position in which the closure does not cover the drinking opening; and
a handle coupled to the lid base, the handle rotatable about a handle rotation axis,
wherein when the closure is in the closed position, the closure remains in the closed position when the handle is rotated within a first handle range, and
wherein in response to the handle being rotated beyond the first handle range when the closure is in the closed position, the closure automatically moves from the closed position to the open position;
wherein the first handle range is at least 90 degrees.

21. The lid of claim 20, wherein the handle can extend vertically from the lid base within the first handle range.

22. The lid of claim 20, wherein the first handle range ends at a handle position that extends horizontally from the lid base such that rotating the handle to a declined position when the closure is in the closed position causes the closure to automatically move from the closed position to the open position.

23. The lid of claim 20, wherein the handle can be rotated beyond the first handle range by rotating the handle in a first rotational direction but not by rotating the handle in a second rotational direction.

24. The lid of claim 23, wherein the closure rotates in the first rotational direction when moving from the closed position to the open position.

25. A method for unsealing a drinking opening of a beverage container, the method comprising:
- rotating a handle of a beverage container lid in a first rotational direction about a handle axis, wherein rotating the handle in the first rotational direction causes a closure of the lid to open and thereby unseal the drinking opening; and
- releasing the handle, wherein releasing the handle causes the handle to rotate about the handle axis in a second rotational direction opposite the first rotational direction while the closure remains in an open position;
- wherein rotating the handle in the first rotational direction comprises rotating the handle from a horizontal position to a declined position relative to a vertical axis of the container.

26. The method of claim 25, wherein the closure of the lid opens by rotating in the first rotational direction about a closure axis.

27. The method of claim 25, wherein rotating the handle in the first rotational direction causes a latching member retaining the closure in a closed position to unlatch.

* * * * *